(12) United States Patent
Hennessey

(10) Patent No.: US 6,671,975 B2
(45) Date of Patent: Jan. 6, 2004

(54) PARALLEL KINEMATIC MICROMANIPULATOR

(76) Inventor: C. William Hennessey, 9745 Raleigh St., Westminster, CO (US) 80031

( * ) Notice: Subject to any disclaimer, the term of this patent is extended or adjusted under 35 U.S.C. 154(b) by 18 days.

(21) Appl. No.: 10/014,956

(22) Filed: Dec. 10, 2001

(65) Prior Publication Data
US 2003/0106230 A1 Jun. 12, 2003

(51) Int. Cl.$^7$ ............................................. G01D 21/00
(52) U.S. Cl. ............................... 33/645; 33/533; 33/644
(58) Field of Search ........................... 33/645, 520, 533, 33/613, 644, 558, 561

(56) References Cited

U.S. PATENT DOCUMENTS

| | | | |
|---|---|---|---|
| 4,655,548 A | 4/1987 | Jue | 350/245 |
| 4,790,718 A | 12/1988 | Vickers | 414/735 |
| 4,798,439 A | 1/1989 | Preston | 350/96.2 |
| 4,819,496 A | 4/1989 | Shelef | 74/479 |
| 4,936,655 A | 6/1990 | Leib et al. | 350/321 |
| 4,955,683 A | 9/1990 | Shiga et al. | 350/96.2 |
| 4,988,244 A * | 1/1991 | Sheldon et al. | 409/132 |
| 5,028,180 A * | 7/1991 | Sheldon et al. | 409/201 |
| 5,136,433 A | 8/1992 | Durell | 359/829 |
| 5,279,176 A | 1/1994 | Tahmasebi et al. | 74/479 |
| 5,333,514 A | 8/1994 | Toyama et al. | 74/479 |
| 5,453,653 A | 9/1995 | Zumeris | 310/323 |
| 5,511,931 A | 4/1996 | Arai et al. | |
| 5,559,909 A | 9/1996 | Anderson et al. | 385/16 |
| 5,604,593 A | 2/1997 | McMurtry | 356/358 |
| 5,616,980 A | 4/1997 | Zumeris | 310/323 |
| 5,623,562 A | 4/1997 | Anderson et al. | 385/16 |
| 5,664,033 A | 9/1997 | Scheu et al. | 385/16 |
| 5,682,076 A | 10/1997 | Zumeris | 310/323 |
| 5,714,833 A | 2/1998 | Zumeris | 310/328 |
| 5,797,191 A | 8/1998 | Ziegert | 33/503 |
| 5,836,083 A * | 11/1998 | Sangwan | 33/644 |
| 5,870,834 A * | 2/1999 | Sheldon | 33/556 |
| 5,881,198 A | 3/1999 | Haake | 385/136 |
| 6,021,579 A | 2/2000 | Schimmels et al. | 33/645 |
| 6,048,750 A | 4/2000 | Hembree | 438/107 |
| 6,071,031 A | 6/2000 | Bailey | 403/57 |
| 6,086,283 A | 7/2000 | Ziegert | 403/57 |
| 6,099,217 A | 8/2000 | Wiegand et al. | 409/201 |
| 6,184,987 B1 | 2/2001 | Jang et al. | 356/388 |
| 6,201,908 B1 | 3/2001 | Grann | 385/24 |
| RE37,374 E | 9/2001 | Roston et al. | 318/561 |
| 6,301,403 B1 | 10/2001 | Heanue et al. | 385/18 |
| 6,304,393 B1 | 10/2001 | Sechrist et al. | 359/822 |

FOREIGN PATENT DOCUMENTS

| | | |
|---|---|---|
| DE | 19742205 | 3/1998 |
| DE | 19715226 | 10/1998 |
| EP | 0712170 A1 | 5/1996 |
| EP | 11090867 | 6/1999 |
| WO | WO 00/45991 | 8/2000 |

OTHER PUBLICATIONS

INA USA Corporation, product specification sheet entitled "Components for Parallel Kinematics—Series GLK, GLK 2, GLK 3 and GLAE", Germany (Date unknown).

(List continued on next page.)

Primary Examiner—Christopher W. Fulton

(57) ABSTRACT

A method and an apparatus for providing nanometer precision motion are provided. According to the invention, a parallel kinematic micromanipulator is formed using at least three kinematic links. The kinematic links may include a high resolution, non-contact encoder to provide position information. Movement of the micromanipulator is effected using piezoelectric linear actuators provided in connection with each of the kinematic links. The combination of a parallel kinematic structure and piezoelectric linear actuators provides a micromanipulator capable of positioning components or instruments with high accuracy or repeatability. In accordance with the present invention, kinematics of three and six degrees of freedom may be provided.

60 Claims, 12 Drawing Sheets

OTHER PUBLICATIONS

Bayside Motion Group, brochure entitled "Photonics Nanopositioning Systems", May 2001, Port Washington, N.Y.

ALIO Industries, brochure entitled "Precision Stages for Nanometer Applications", Loveland, Colorado. (Date unknown).

ALIO Industries, brochure entitled "Precision Motion for Fiber Optic Alignment", Loveland, Colorado. (Date unknown).

Nanomotion Ltd., "Theory of Operation", available at www.nanomotion.net/techback.html, downloaded Nov. 8, 2001.

Nanomotion, Inc., brochure entitled "Product Selection Guide", copyright 2001, Ronkonkoma, N.Y.

Physik Instrumente, "F–206 Six–AXIS Parallel Kinematics Positioning System", available at www.physikinstrument-e.com/micropositioningsystems/8 6.html, downloaded Oct. 31, 2001, copyright 1996–2001 by Physik Instrumente.

Physik Instrumente, "M–850 Hexapod 6–AXIS Parallel Kinematics Robot", available at www.physikinstrument-e.com/micropositioningsystem/8 4.html, downloaded Oct. 31, 2001, copyright 1996–2001 by Physik Instrumente.

* cited by examiner

PRIOR ART

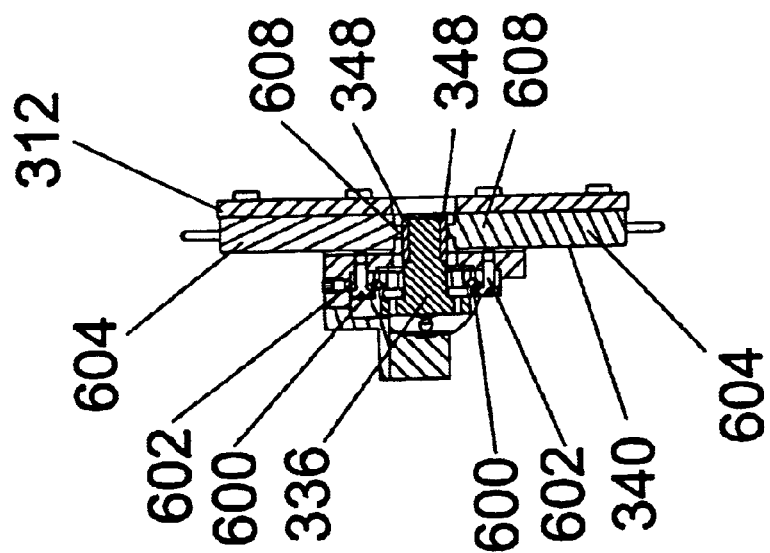
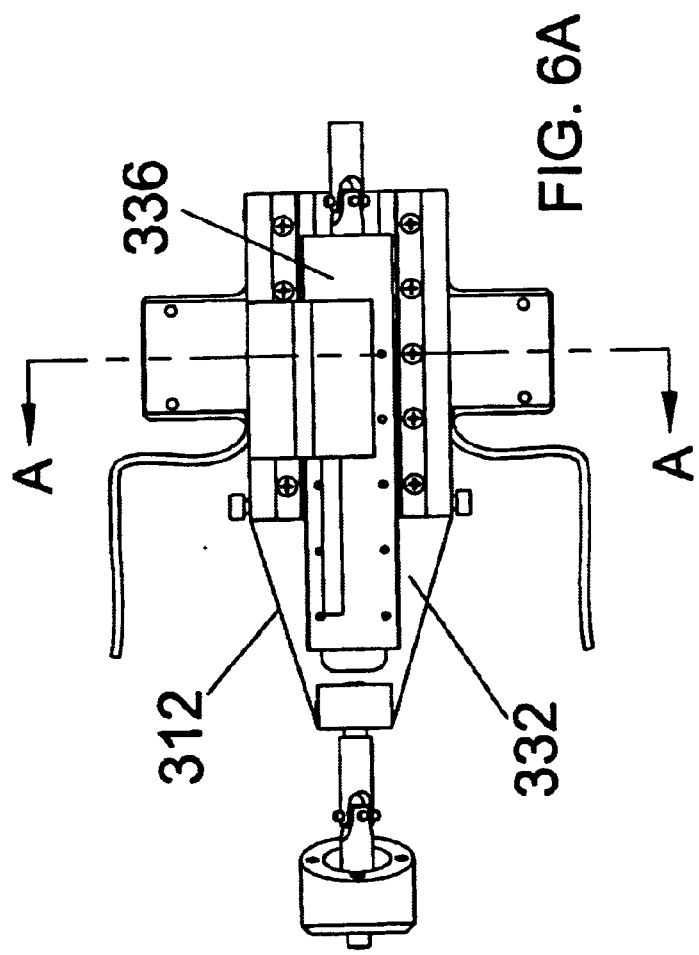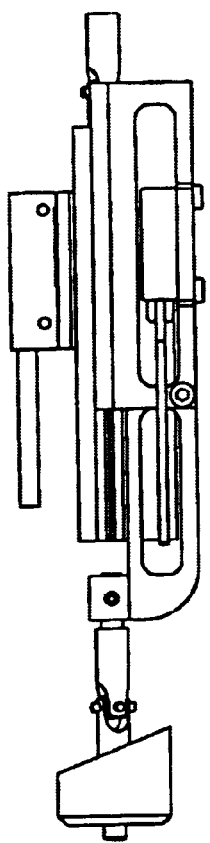
SECTION A-A
FIG. 6B
FIG. 6A

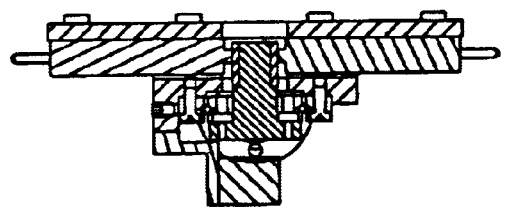
SECTION A-A
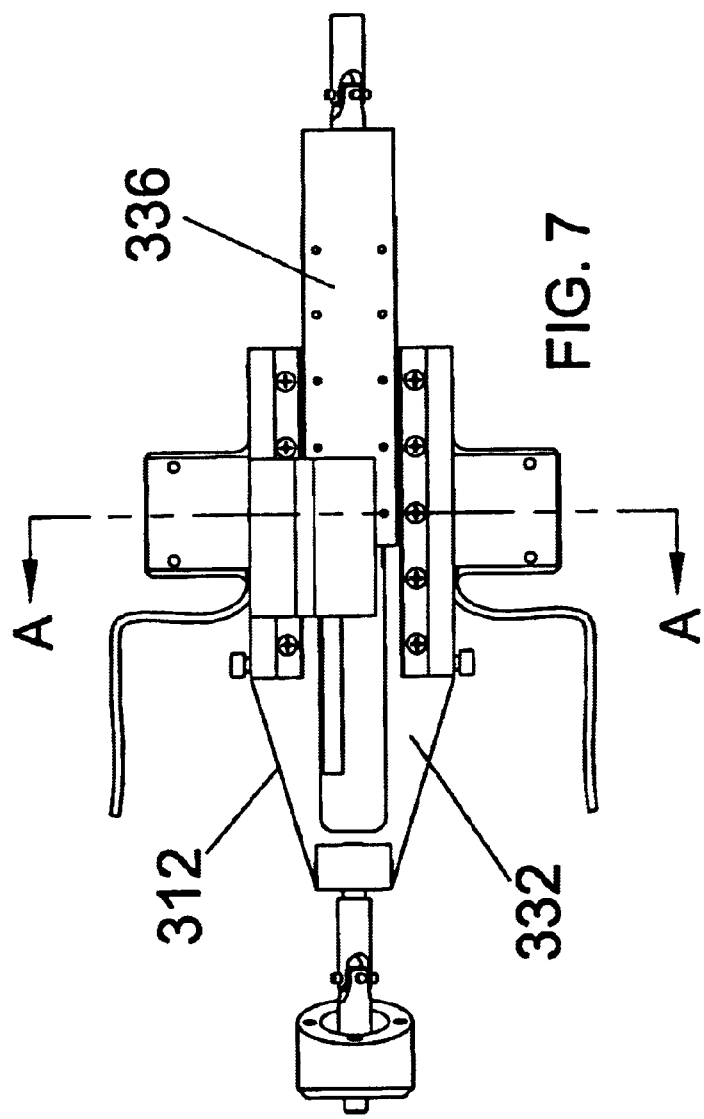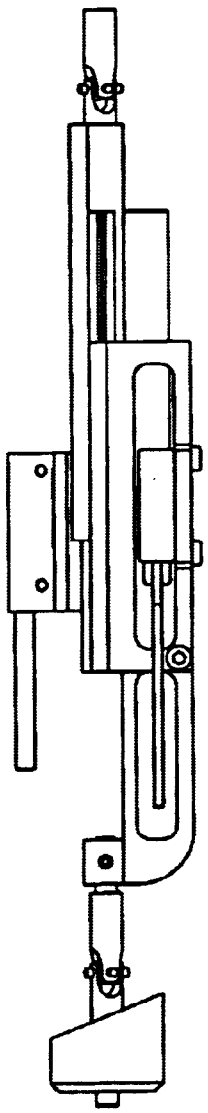
FIG. 7

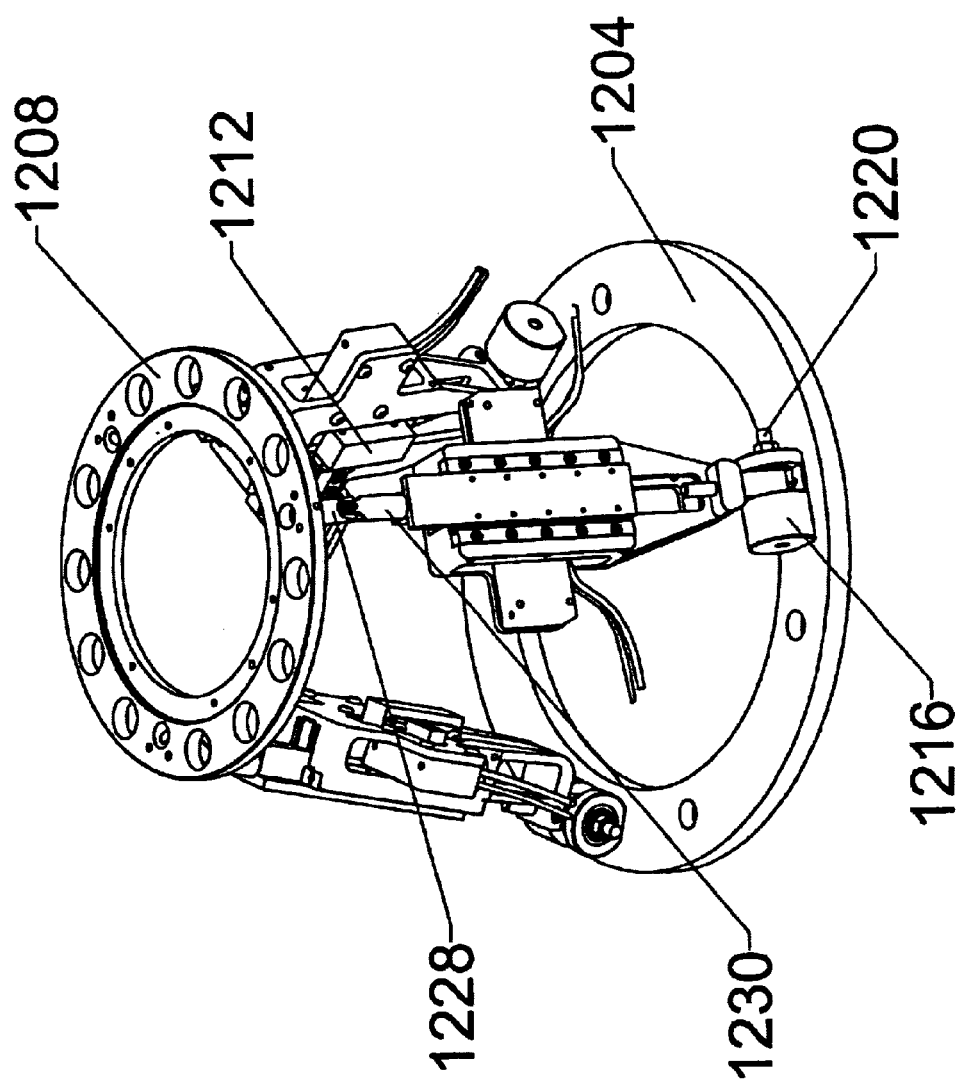

PARALLEL KINEMATIC MICROMANIPULATOR

FIELD OF THE INVENTION

The present invention relates to a device for positioning components with high precision. In particular, the present invention relates to a parallel kinematic manipulator capable of positioning components with nanometer tolerances.

BACKGROUND OF THE INVENTION

The precise positioning of components is increasingly important. For instance, optical communications systems require that the ends of optical fibers be precisely aligned with mating components or fibers to ensure minimal transmission losses. The precision alignment of components is also important in connection with the manufacture of semiconductor devices, and with devices having miniaturized components and/or fine tolerance requirements. As yet another example, precision surgery applications, including remote surgery, require the ability to precisely control the position and movement of instruments. However, previous attempts at providing for the precise positioning of a component or instrument have been incapable of providing high resolution positioning. In particular, previous attempts at providing devices capable of precisely positioning components and instruments have been incapable of providing a desired number of degrees of freedom in combination with a desired positioning tolerance.

Manipulators or positioners capable of providing a number of degrees of freedom are available. One such type of device is a manipulator having stacked stages. An example of a manipulator 100 incorporating stacked stages is illustrated in FIG. 1. The manipulator 100 includes first 104, second 108 and third 112 linear stages for providing linear movement of the mobile plate or tool plate 116 relative to the base plate 120. In particular, the linear stages 104, 108 and 112 provide movement of the mobile plate 116 with, respect to the base plate 120 along the x, y and z axes. In addition, a first 124 and second 128 rotational stage are provided to rotate the mobile plate 116 with respect to two separate axes. The combination of three linear stages 104, 108 and 112 and two rotational stages 124 and 128 provides a manipulator 100 having five degrees of freedom.

Although the manipulator 100 is capable of providing five different movements for positioning a component or instrument interconnected to the mobile plate 116, the resolution or step size with which such positioning can be accomplished is limited. In particular, manipulators having stacked stages, such as the manipulator 100 illustrated in FIG. 1, suffer from additive positioning errors. Specifically, there are sine and cosine position errors associated with each movement, in addition to linear (or rotational) position errors. Errors associated with each stage can contribute additively to an overall positioning error associated with the manipulator. As a result, even if great efforts are made to accurately control the position of each stage, the overall positioning error remains relatively high. For example, if each linear actuator has an error of 50 nm, the overall positioning error of the manipulator is likely to be at least 150 nm. Adding in errors associated with the rotational stages, and sine and cosine errors, a high quality, 5 degree of freedom manipulator 100 having stacked stages is likely to have 250 nm or more of position error.

Parallel mechanisms provide a manipulator structure that avoids additive errors. In a parallel mechanism, such as the parallel mechanism 200 illustrated in FIG. 2, a base plate 204 is interconnected to a mobile plate 208 by a plurality of kinematic links 212. In the parallel mechanism 200 illustrated in FIG. 2, six kinematic links 212a–f are provided. As a result, the parallel mechanism manipulator 200, also known as a hexapod, is capable of moving the mobile plate (tool plate) 208 with six degrees of freedom (x, y, z, $\Psi$, $\theta$, $\psi$). Because the position error of a parallel mechanism is not additive, higher positioning tolerances are possible than with a stacked stage type device (e.g., manipulator 100 in FIG. 1). For example, if positioning resolutions of 50 nm are available with respect to each kinematic link, a parallel mechanism type manipulator such as the manipulator 200 illustrated in FIG. 2 might be capable of positioning the mobile plate 208 with a resolution that is also about equal to 50 nm. Although such resolution is acceptable in many cases, it is still too high for may applications, particularly aligning fiber optic cables.At the same time, it is also desirable to provide actuators capable of operating at high velocities, for example, to speed up production processes. Typical actuators include servo motors, linear motors and inch worm type ceramic actuators.

Servo motor type actuators may suffer from backlash associated with the screw-type jacking mechanisms often used to effect changes in the length of the kinematic link. In addition, servo and linear motor type actuators suffer from dithering, which involves high frequency, small amplitude movements of the motor as it searches for the correct position. Such dithering can result in vibrations that can interfere with intended positioning operations, even when changes in the lengths of the kinematic links are not being effected.

Inch worm-type piezoelectric motors generally include a pair of ceramic rings capable of selectively engaging a rod running through the rings. In particular, the ceramic rings can be electrically excited in such a way as to controllable move the rod with respect to the rings. Although such devices are capable of providing small changes in the length of a kinematic chain, they suffer from inaccuracies due to hysteresis. Therefore, it is difficult to accurately control the length of a kinematic chain utilizing an inch worm-type piezoelectric actuator. The operation of such devices is also relatively slow. In addition, the operation of inch worm-type piezoelectric actuators creates vibrations that can interfere with the intended positioning operations.

Therefore, there is a need for a method and apparatus capable of providing for the precise positioning of a component or instrument. In particular, there is a need for a method and apparatus for providing a manipulator capable of positioning a component or instrument with high repeatability, resolution, and speed, without dither.

SUMMARY OF THE INVENTION

In accordance with the present invention, a parallel kinematic micromanipulator is disclosed. Also disclosed is a method for precisely positioning a component or instrument. The method and apparatus of the present invention allows for the positioning of components and instruments with extremely high repeatability and allows multiple degrees of freedom in the movement of a component or instrument.

The inventor of the present invention has recognized that higher positioning resolutions than are available using prior art manipulators would require kinematic links capable of having their lengths controlled with greater precision. Furthermore, the inventor of the present invention has recognized that the inaccuracies encountered with respect to the position of individual kinematic links are in large part due to the inaccuracies inherent to the actuators used to control the length of the kinematic links. Such actuators have included servo motors, linear motors, and inch worm-type ceramic actuators. In contrast, the present invention comprises linear piezoelectric actuator assemblies capable of providing movement with resolutions that have not been available in connection with conventional manipulators. As can be appreciated by one of skill in the art, piezoelectric actuators take advantage of the piezoelectric effect exhibited by certain crystals, in which the application of an electric field causes the crystal to expand or contract in certain directions. Furthermore, the linear piezoelectric actuator assemblies utilized in connection with the present invention are capable of providing motion that is substantially continuous, as opposed to the intermittent, start-stop type motion provided by inch worm type piezoelectric devices.

In accordance with an embodiment of the present invention, a parallel mechanism comprising at least three kinematic links is provided. Each kinematic link comprises at least a first piezoelectric linear actuator capable of providing repeatable movement of its respective link with a resolution of no more than about 10 nm. Such a micromanipulator is capable of positioning components or devices with very high repeatability and resolution and can provide at least three degrees of freedom.

According to another embodiment of the present invention, a micromanipulator comprising a hexapod type parallel mechanism is provided. Furthermore, each of the six kinematic links of the hexapod comprises a piezoelectric linear actuator assembly. The combination of the parallel mechanism configuration with piezoelectric actuators results in a micromanipulator capable of providing movements having resolutions of 10 nm or less. In addition, such an embodiment of the present invention is capable of providing a micromanipulator having six degrees of freedom.

According to a further embodiment of the present invention, parallel mechanisms are provided comprising a plurality of kinematic links. Each kinematic link comprises a piezoelectric linear actuator assembly comprising at least two piezoelectric ceramic elements. According to still another embodiment of the present invention, the piezoelectric linear actuator assemblies each comprise at least a first rectangular piezoelectric ceramic element interconnected to a carrier member and having a plurality of electrodes that can be excited to produce controlled movement of a slide member. According to yet another embodiment of the present invention, the piezoelectric linear actuator assemblies comprise dual mode standing wave motors.

In accordance with another embodiment of the present invention, a method for precisely positioning components or instruments is provided. According to the method, a mobile plate is interconnected to a base plate by a plurality of kinematic links. Each of the kinematic links comprises at least a first piezoelectric linear actuator assembly. A first component or instrument is interconnected to the mobile plate, while a second component, assemblage or body is placed in a fixed position relative to the base plate. Electrical excitation is selectively provided to a plurality of the piezoelectric linear actuator assemblies to effect movement of the mobile plate with respect to the base plate. In particular, electrical excitation is selectively provided to the piezoelectric linear actuator assemblies to move the component or instrument interconnected to the mobile platform in any of a plurality of directions. In accordance with an embodiment of the present invention, movement may be provided along any one of three axes. According to still another embodiment of the present invention, translational movement may be provided with respect to three axes, and rotational movement may be provided about any of the three axes.

Based on the foregoing summary, a number of salient features of the present invention are readily discerned. A micromanipulator capable of controlled movement in a variety of directions is provided. The amount of movement may be controlled with a high degree of precision and repeatability. The present invention is well-suited for applications requiring the alignment of precision componentry, such as in connection with the alignment of optical fibers. In addition, the present invention is well suited to applications requiring precisely controlled movements, such as surgical applications.

BRIEF DESCRIPTION OF THE DRAWINGS

FIG. 6A is a plan view of a kinematic link in accordance with an embodiment of the present invention with the kinematic link shown in a first position;

FIG. 6B is a cross-section of the kinematic link illustrated in FIG. 6A;

FIG. 7 is a plan view of the kinematic link illustrated in FIG. 6A, with the kinematic link shown in a second position;

FIG. 12 is a perspective view of a parallel mechanism manipulator in accordance with another embodiment of the present invention.

DETAILED DESCRIPTION

Figure 1:
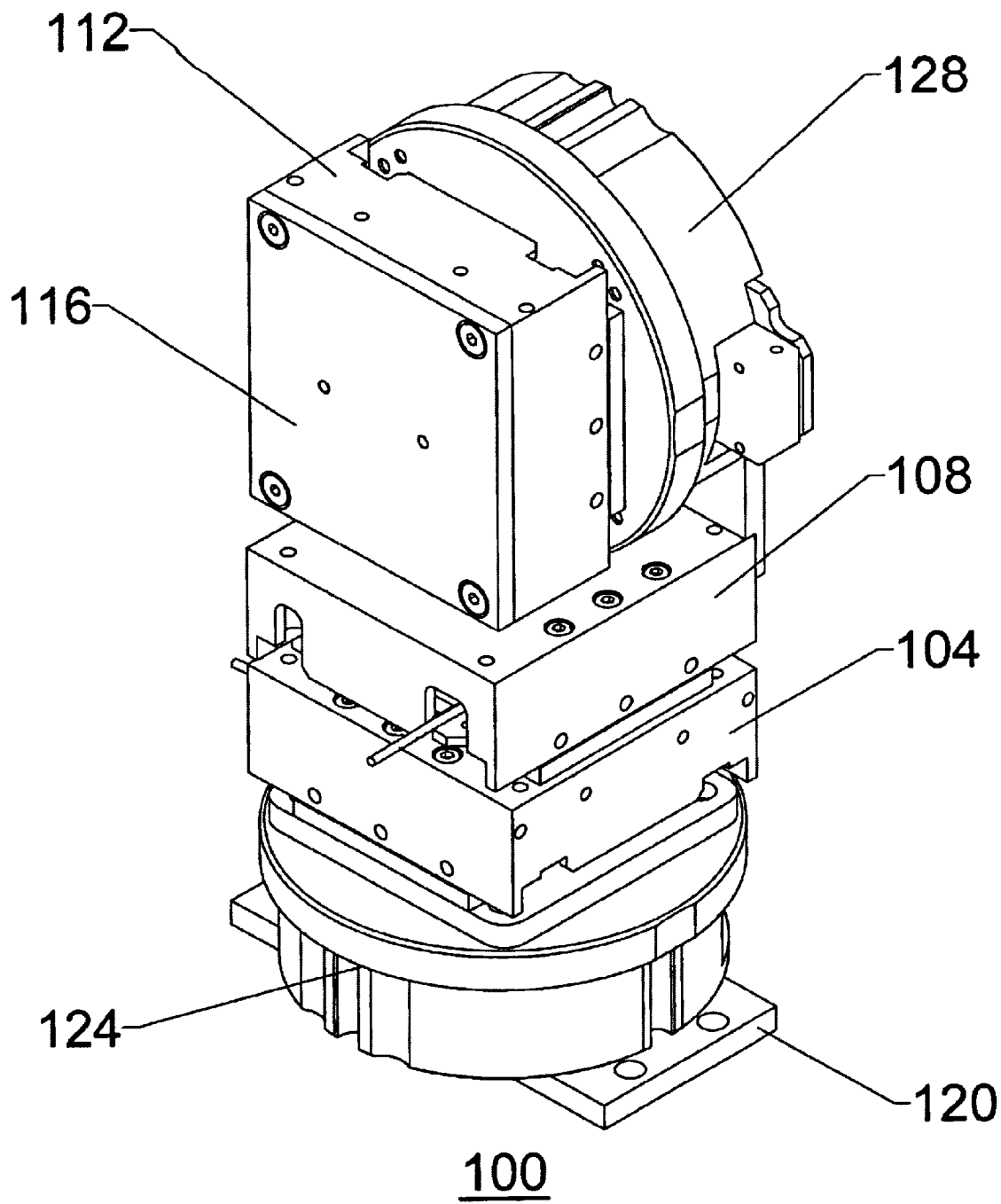
FIG. 1 is a perspective view of a manipulator having stacked stages in accordance with the prior art.
Figure 2:
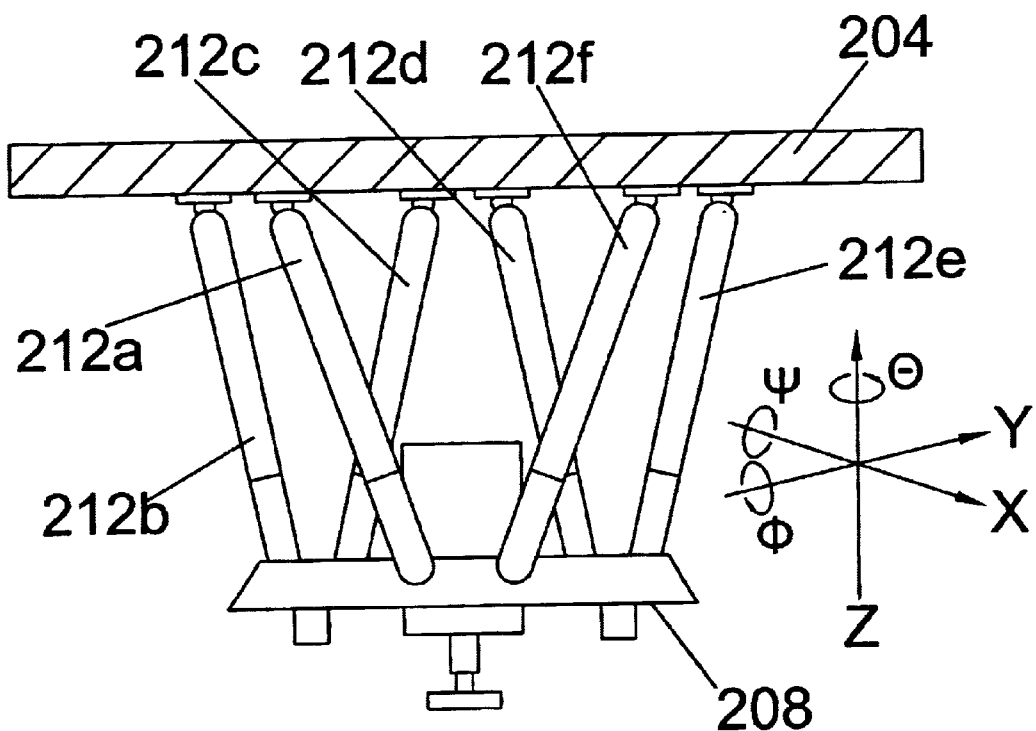
FIG. 2 is an elevational view of a hexapod manipulator in accordance with the prior art.
Figure 3:
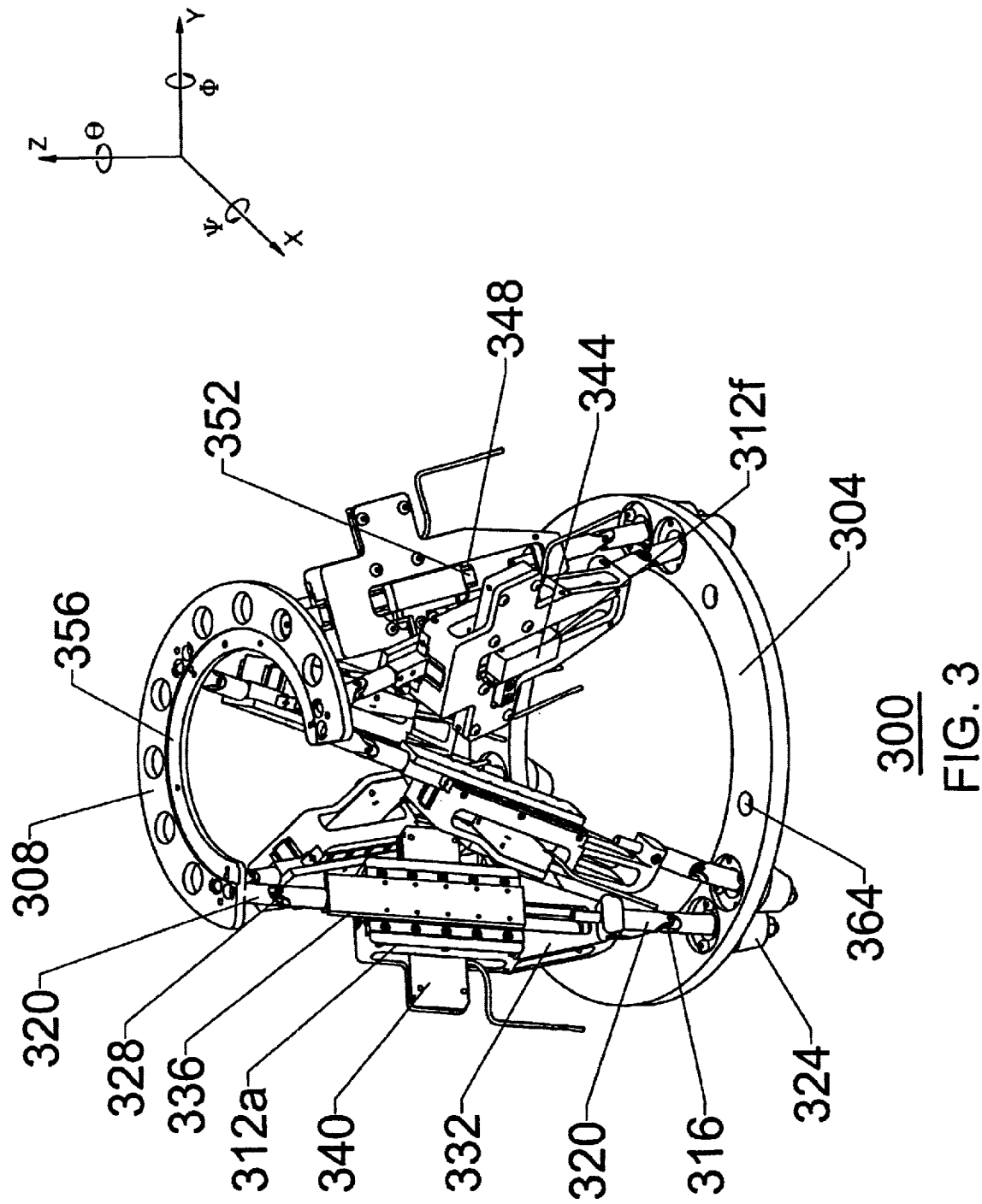
FIG. 3 is a perspective view of a parallel mechanism manipulator in accordance with an embodiment of the present invention.
Figure 4:
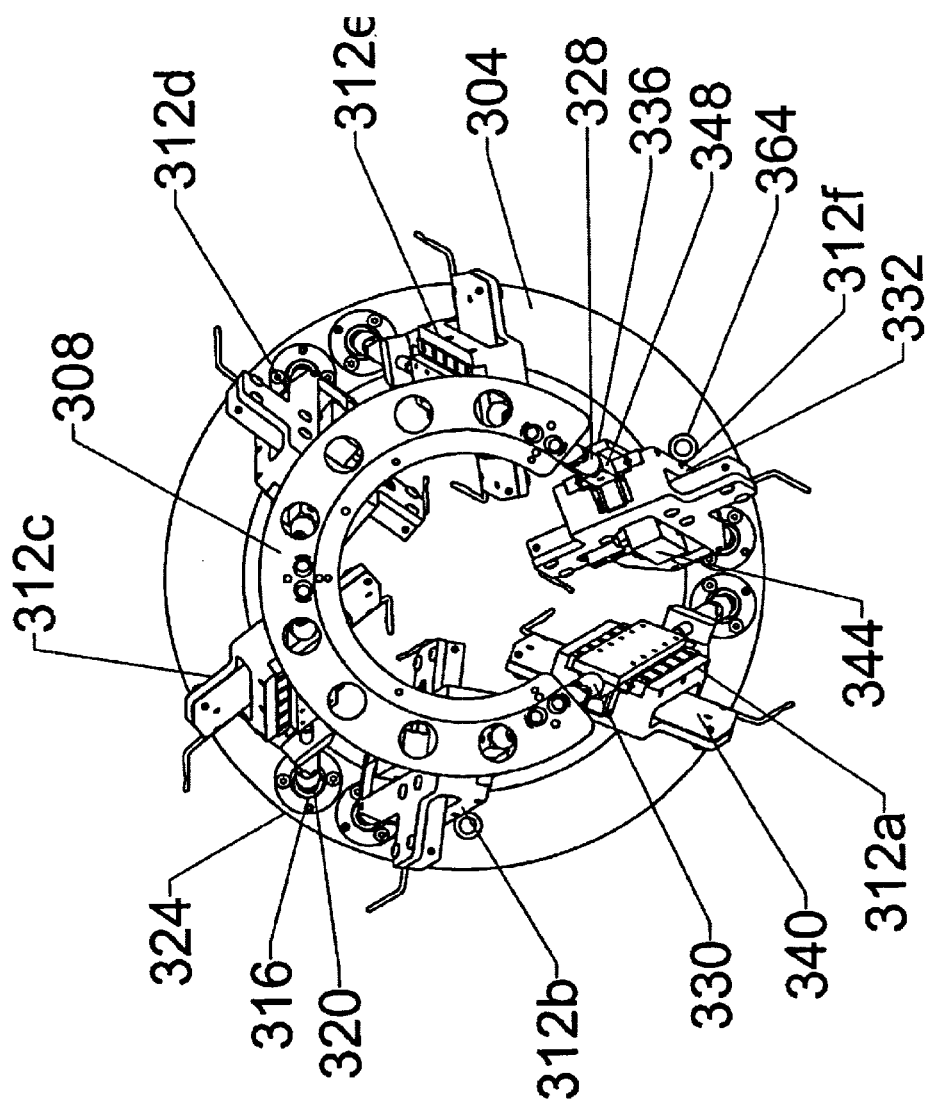
FIG. 4 is a top view of the parallel mechanism manipulator illustrated in FIG. 3, with the mobile plate shown in a first position.
Figure 5:
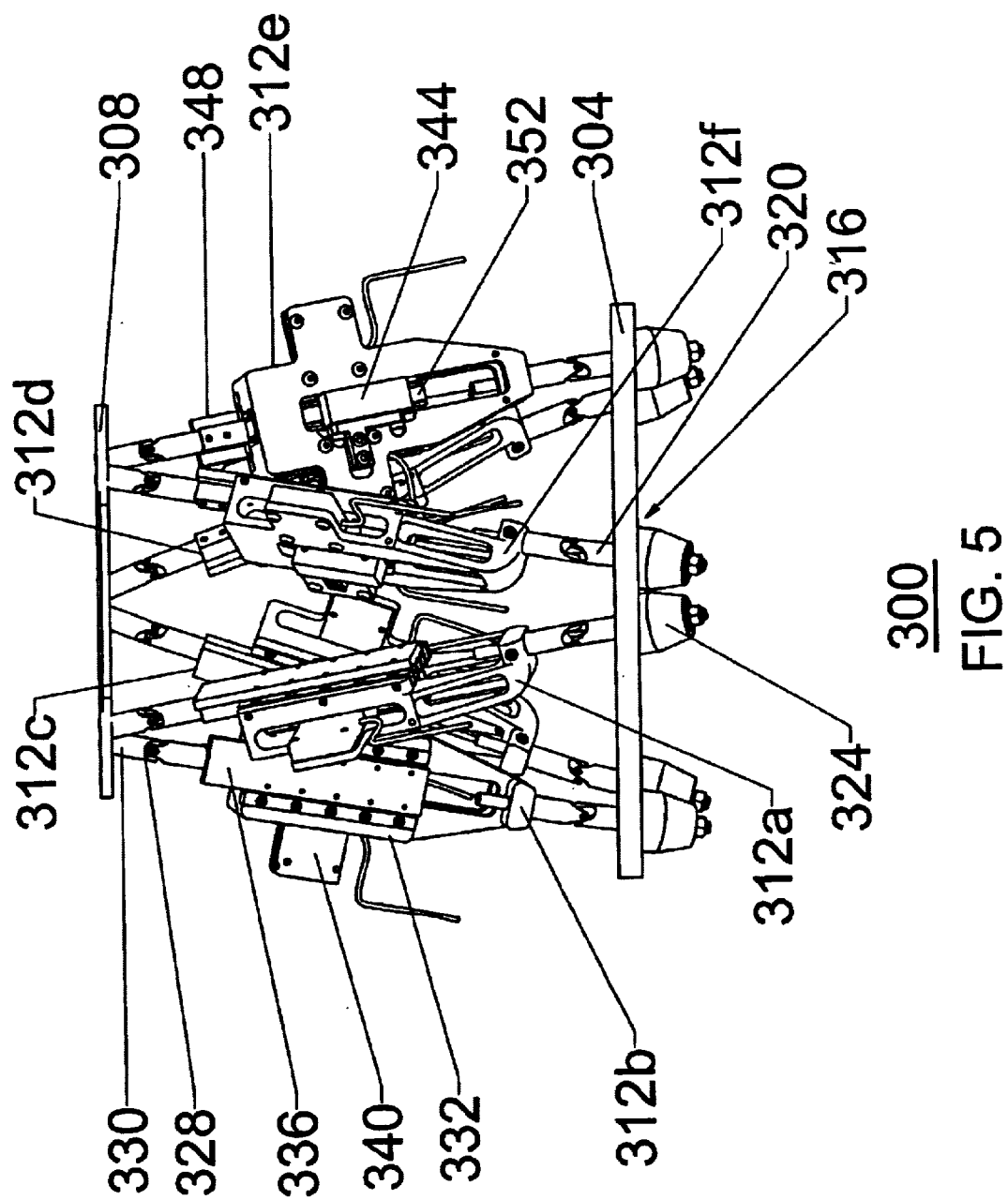
FIG. 5 is a side view of the parallel mechanism manipulator illustrated in FIG. 3, with the mobile plate shown in a first position.

With reference now to FIGS. 3, 4 and 5, a parallel mechanism manipulator comprising piezoelectric linear actuator assemblies in accordance with an embodiment of the present invention is illustrated. In general, the manipulator 300 includes a base plate 304 and a mobile plate or tool plate 308 interconnected to one another by at least three kinematic links 312. In the embodiment illustrated in FIGS. 3, 4 and 5, six kinematic links 312 are used to interconnect the base plate 304 to the mobile plate 308. Accordingly, the manipulator 300 illustrated in FIGS. 3, 4 and 5 is a hexapod type parallel mechanism. As shown in FIGS. 3, 4 and 5, the mobile plate 308 is in a first position, in which the mobile plate 308 is parallel to the base plate 304, and in which the center point of the mobile plate 308 is aligned along the Z-axis with the center point of the base plate 304.

Each kinematic link 312 is interconnected to the base plate 304 at a first joint 316, located at a first end of each kinematic link 312. In general, the first joint 316 allows the angle of the kinematic link 312 with respect to the base plate 304 to be varied. In the embodiment illustrated in FIG. 3, the first joint 312 comprises a universal joint 320 and a thrust bearing 324. At a second end of each kinematic link 312 a second joint 328, such as a universal joint 330, may be provided to interconnect each kinematic link 312 to the mobile plate 308 and to allow the associated kinematic link 312 to move relative to the mobile plate 308. According to another embodiment of the present invention, one or both of the first 316 and second 328 joints comprise spherical joints.

In accordance with the present invention, the first joints 316 are located about a circle having a first diameter. In addition, the second joints 328 are located about a circle having a second diameter that is different than the first diameter of the circle about which the first joints 316 are located. The arrangement of the opposite ends of the kinematic links 312 about circles of different diameters allows translational movement of the mobile plate 308 in the x and y directions.

In addition, the interconnections between the kinematic links 312 and the base plate 304 and the mobile plate 308 in the embodiment illustrated in FIGS. 3, 4 and 5 are arranged to allow rotational movement of the mobile plate about the z-axis. In particular, the kinematic links 312 are interconnected to the plate 304 and 308 such that the first end of a first kinematic link 312 is in close proximity to the first end of a second kinematic link 312, and the second end of the first kinematic link 312 is in close proximity to the second end of a third kinematic link 312. For example, in FIG. 5, the first end of the first kinematic link 312a can be seen to be interconnected to the base plate 304 at a position that is in close proximity to the position at which the first end of the sixth kinematic link 312f is interconnected to the base plate 304. In addition, the second end of the first kinematic link 312a is interconnected to the mobile plate 308 at a position that is in close proximity to the position at which the second end of the second kinematic link 312b is interconnected to the mobile plate 308.

In general, the position of the mobile plate 308 is varied with respect to the base plate 304 by varying the lengths of the kinematic links 312. By coordinating the movement of individual kinematic links 312, the mobile plate or tool plate 308 may be moved with respect to the base plate 304 in six degrees of freedom.

As can be appreciated by one of ordinary skill in the art, a manipulator having six degrees of freedom is capable of translational movement along the x, y and z axes, as well as rotational movement about each of the x, y and z axes. These rotational movements, also referred to as pitch, yaw and roll, are shown as angular rotations ($\Psi$, $\theta$, and $\psi$) on the coordinate system illustrated in FIG. 3.

Each kinematic link 312 comprises a carrier assembly 332 and a slide assembly 336. The carrier assembly 332 may include a piezoelectric linear actuator assembly 340 and an encoder sensor 344. The slide assembly 336 generally includes a traction surface 348, such as a strip of ceramic material that is operated on by the piezoelectric linear actuator assembly 340 to move the slide assembly 336 relative to the carrier assembly 332. In addition, the slide assembly 336 may include an encoder strip 352 that is read by the encoder sensor 344 to determine the position of the slide assembly 336 relative to the carrier assembly 332. From the relative position of the carrier assembly 332 and the slide assembly 336, the length of the kinematic link 312 can be determined. It will be noted that the various components of the kinematic links 312 are arranged such that the mass of the slide assembly 336 is relatively small. By keeping the mass of the slide assembly 336 small, the inertia of the components of the manipulator 300 moved during positioning operations is reduced, increasing the accuracy with which the position of the mobile plate 308 can be controlled.

In the embodiment of the present invention illustrated in FIGS. 3, 4 and 5, the mobile plate 308 is relieved in an area between a second end of the first kinematic link 312a and the second end of the sixth kinematic link 312f. Although not required, relieving an area of the mobile plate 308 facilitates use of the manipulator 300 in connection with the positioning of long components, such as fiber optic cables. The mobile plate 308 may also include a recess 356 and attachment points 360 to facilitate the receipt and positioning of attachment plates or chucks used to receive a component or instrument. Likewise, the base plate 304 may be provided with attachment points 364 for fixing the position of the base plate 304 with respect to a component, assemblage or body with respect to which the component or instrument interconnected to the mobile plate 308 is to be positioned and/or moved. The attachment points 360 and 364 may include, but are not limited to, mechanical fastening or indexing components, such as studs or holes, both threaded and smooth bore.

With reference now to FIG. 6A, an individual kinematic link 312 is illustrated in plan view. In FIG. 6A, the carrier assembly 332 and the slide assembly 336 are shown in a position of maximum overlap, such that the overall length of the kinematic link 312 is at a minimum.

FIG. 6B illustrates a cross section of the kinematic link 312 shown in FIG. 6A, taken along section line A—A in FIG. 6A. In FIG. 6B, the prismatic joint 600 between the carrier assembly 332 and the slide assembly 336 that allows the length of the kinematic link to be altered is visible. In accordance with an embodiment of the present invention, the prismatic joint 600 is formed by cross roller bearings 602. In general, the bearings 602 allow translational movement between the carrier assembly 332 and the slide assembly 336 so that the overall length of the kinematic link 312 can be varied, while allowing very little or zero movement between the carrier assembly 332 and the slide assembly 336 in directions that are not parallel to major axis (i.e. the length) of the kinematic link 312.

Also visible in FIG. 6B are the traction surfaces 348. In the embodiment illustrated in FIG. 6B, the traction surfaces 348 are provided on opposite sides of the slide assembly 336. The traction surfaces 348 are operated on by the piezoelectric linear actuator assembly 340. In the embodiment illustrated in FIGS. 3–6, the actuator assembly 340 comprises a pair of piezoelectric ceramic elements 604 having a finger 608 interconnected to a first edge thereof. The fingers 608 bear on the traction surfaces 348, to move the slide assembly 336 relative to the carrier assembly 332, as will be described in greater detail below. In accordance with an embodiment of the present invention, the finger 608 is formed from a ceramic material.

With reference now to FIG. 7, the kinematic link 312 shown in FIG. 6 is illustrated in plan view, with the slide assembly 336 extended relative to the carrier assembly 332. Accordingly, configured as illustrated in FIG. 7, the kinematic link 312 is at a maximum length.

Figure 8:
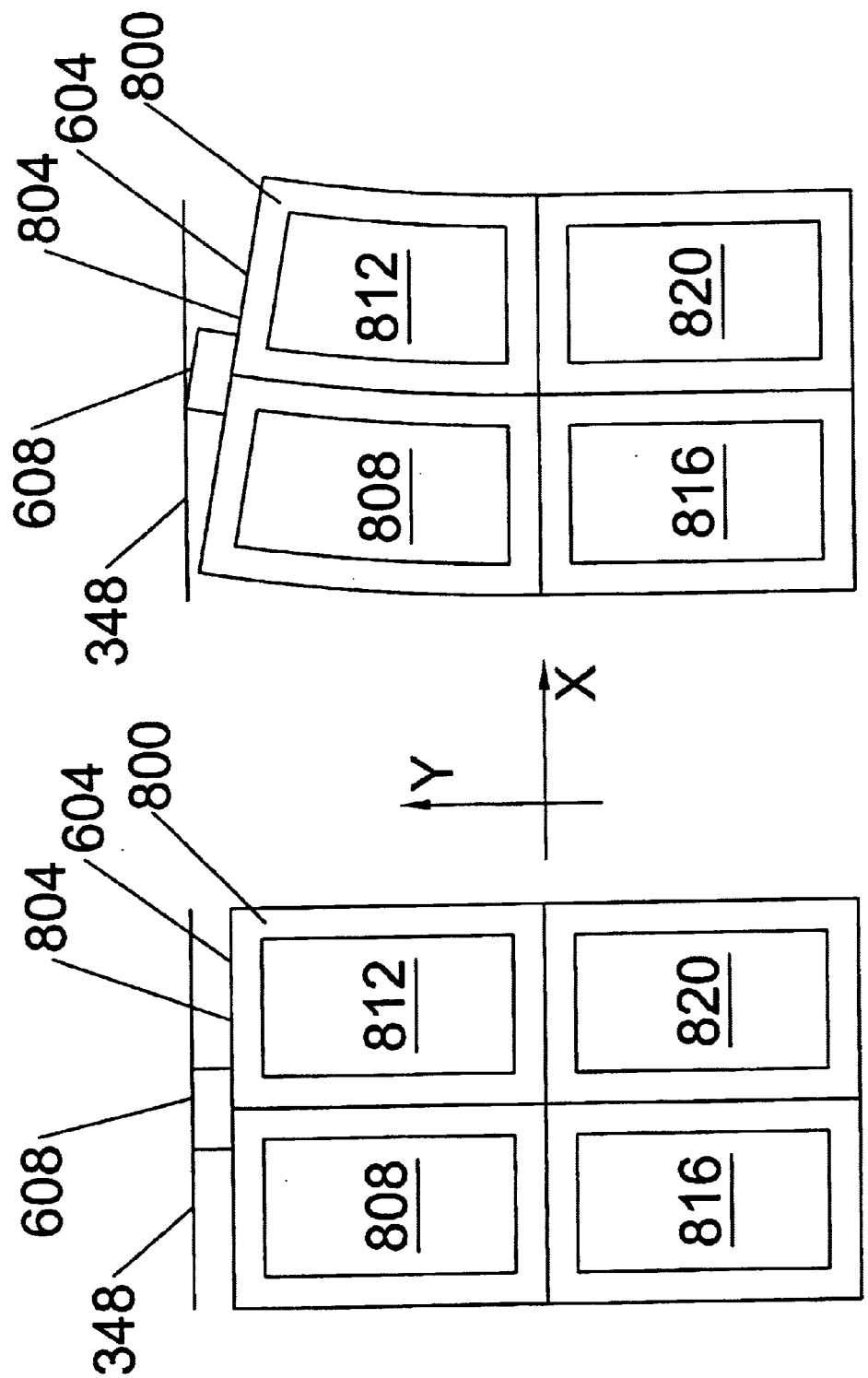
FIG. 8A is a plan view of a piezoelectric ceramic element in accordance with an embodiment of the present invention, with the ceramic element shown in a first position.
FIG. 8B is a plan view of the piezoelectric ceramic element illustrated in FIG. 8A, with the ceramic element shown in a second position.

With reference now to FIGS. 8A and 8B, a large face 800 of a piezoelectric ceramic element 604 included as part of a piezoelectric linear actuator assembly 340 in accordance with an embodiment of the present invention is illustrated in plan view. Also shown is the finger 608 interconnected to a first edge 804 of the piezoelectric ceramic 604 in contact with the traction surface 348 of the slide assembly 336. First 808, second 812, third 816 and fourth 820 electrodes are formed on the surface of the piezoelectric ceramic element 604. A single electrode (not shown) is formed on the large face of the piezoelectric ceramic element 604 opposite the face 800 visible in FIGS. 8A and 8B. This single electrode is grounded.

The dimensions of the piezoelectric ceramic element 604 are chosen so that the resonances of the piezoelectric ceramic element 604 in the x and y directions are closely spaced and have overlapping excitation curves. For example, in the y dimension, the piezoelectric ceramic element 604 may have a one-half mode resonance, and in the x direction, the piezoelectric ceramic element 604 may have a one and one-half mode resonance.

The slide assembly 336 is moved relative to the carrier assembly 332 by selectively exciting the electrodes 808, 812, 816 and 820 such that the finger 608 acts upon the traction surface 348 to move the slide assembly 336 relative to the carrier assembly 332. For example, by electrically exciting diagonally opposed electrodes (e.g., electrodes 812 and 816), at a frequency within the resonance band of the piezoelectric ceramic element 604 in the x and y directions, the piezoelectric ceramic element 604 shortens in the x direction when the change in the y dimension of the piezoelectric ceramic 604 is positive. Accordingly, when so excited, the traction surface 348 and in turn the slide assembly 336 is moved in the negative x direction (leftward in FIGS. 8A and 8B) when movement of the piezoelectric ceramic 604 is constrained. Conversely, electrodes 808 and 820 can be electrically excited while electrodes 812 and 816 are left floating or grounded, to produce movement of the slide assembly 336 in a positive x direction (to the right in FIGS. 8A and 8B).

The distortion of the shape of the piezoelectric ceramic element 604 in response to electrical excitation of diagonally opposed electrodes is illustrated in FIG. 8B, with the change in dimensions greatly exaggerated. In general, the change in dimension of the piezoelectric ceramic element 604 per cycle of electrical excitation of diagonally opposed electrodes results in a very small elliptical trajectory at the edge 804 interconnected to the finger 608. Accordingly, actuators 340 so constructed are known as dual mode standing wave motors. Because the movement of the finger 608 is small, the movement of the traction surface 348 with respect to the piezoelectric ceramic 604 can be very precisely controlled. In addition, because in a preferred embodiment the finger 608 is in continuous contact with the traction surface 348, the piezoelectric ceramic actuator assemblies 340 of the present invention provide a braking force, resisting movement of the slide assembly 336 relative to the carrier assembly 332, even when electrical power is not supplied to the actuator assembly 340. For additional description of a piezoelectric linear actuator suitable for use in connection with the present invention, see U.S. Pat. No. 5,453,653, issued Sep. 26, 1995, and U.S. Pat. No. 5,616,980, issued Apr. 1, 1997, the entire disclosures of which are hereby incorporated herein by reference. In accordance with an embodiment of the present invention, the piezoelectric ceramic actuator assemblies 340 are precision dual mode standing wave motors available from Nanomotion, Inc.

As an alternative to a dual mode standing wave motor, the piezoelectric linear actuator assemblies 340 may comprise direct drive piezoelectric motors. Direct drive piezoelectric motors are suitable for effecting small changes in the length of the kinematic links 312, but are generally not suitable for effecting large movements. Other actuator assemblies 340 capable of providing the required repeatability include, but are not limited to ceramic piezoelectric motors using lead screws.

Figure 9:
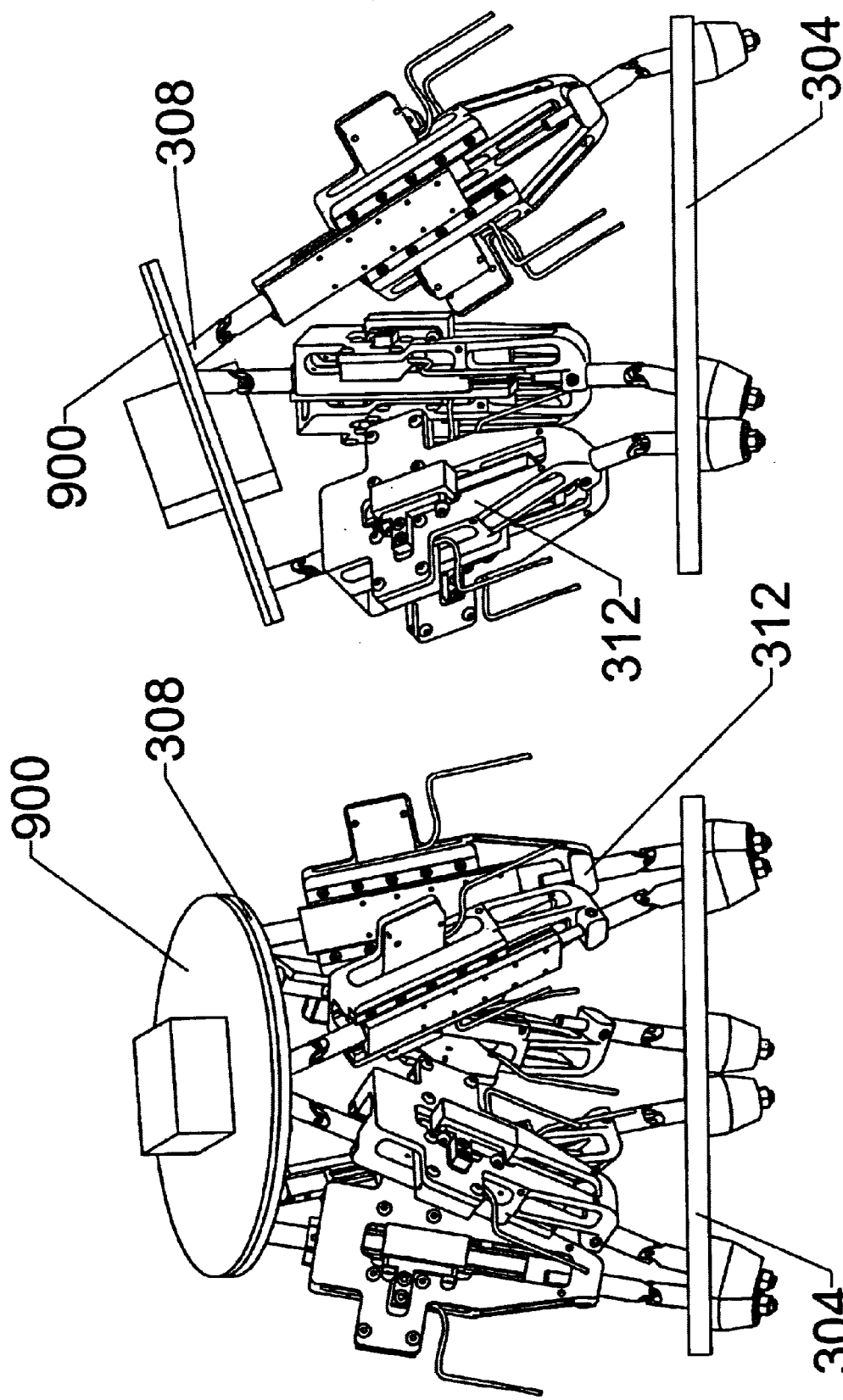
FIG. 9A is a front elevational view of the parallel mechanism manipulator illustrated in FIG. 3, with the top plate shown in a second position.
FIG. 9B is a side elevational view of the parallel mechanism manipulator illustrated in FIG. 3, with the top plate shown in a second position.

With reference now to FIGS. 9A and 9B, a manipulator 300 in accordance with the present invention is illustrated, with the top plate 308 tilted and shifted with respect to the base plate 304. In general, the position of the mobile plate 308 with respect to the base plate 304 can be altered by selectively altering the length of the kinematic links 312. Furthermore, an embodiment having six kinematic links 312, as illustrated in FIGS. 9A and 9B, permits movement of the mobile plate 308 with respect to the base plate 304 with six degrees of freedom. In addition, it should be appreciated that manipulators having more than six kinematic links 312 are included in the present invention. Although greater than six degrees of freedom in the movement of the mobile plate 308 with respect to the base plate 304 are not provided by such a device, the force with which the mobile plate 308 can be moved is greater than with a manipulator having a lesser number of kinematic links 312, assuming that each device uses kinematic links 312 having actuator assemblies 340 capable of individually asserting the same amount of force. However, the inclusion of additional kinematic links 312 complicates control of the position of the mobile plate 308 relative to the base plate 304.

In FIGS. 9A and 9B, an attachment plate 900 is shown interconnected to the mobile plate 308. The attachment plate 900 may function as an adaptor to facilitate the interconnection of a component or instrument to the mobile plate 308.

In general, to effect movement of the mobile plate 308 with respect to the base plate 304, each of the kinematic links 312 must be moved in a coordinated fashion. In particular, for a hexapod manipulator, such as manipulator 300 illustrated in FIGS. 3–5 and 9, six separate equations must be solved. In general, the desired length of the kinematic 16 links 312 is determined by a controller interconnected to the actuators assemblies 340. In addition, the controller receives information from the encoders 344 regarding the length of each kinematic link 312 at any particular moment in time.

Figure 10:
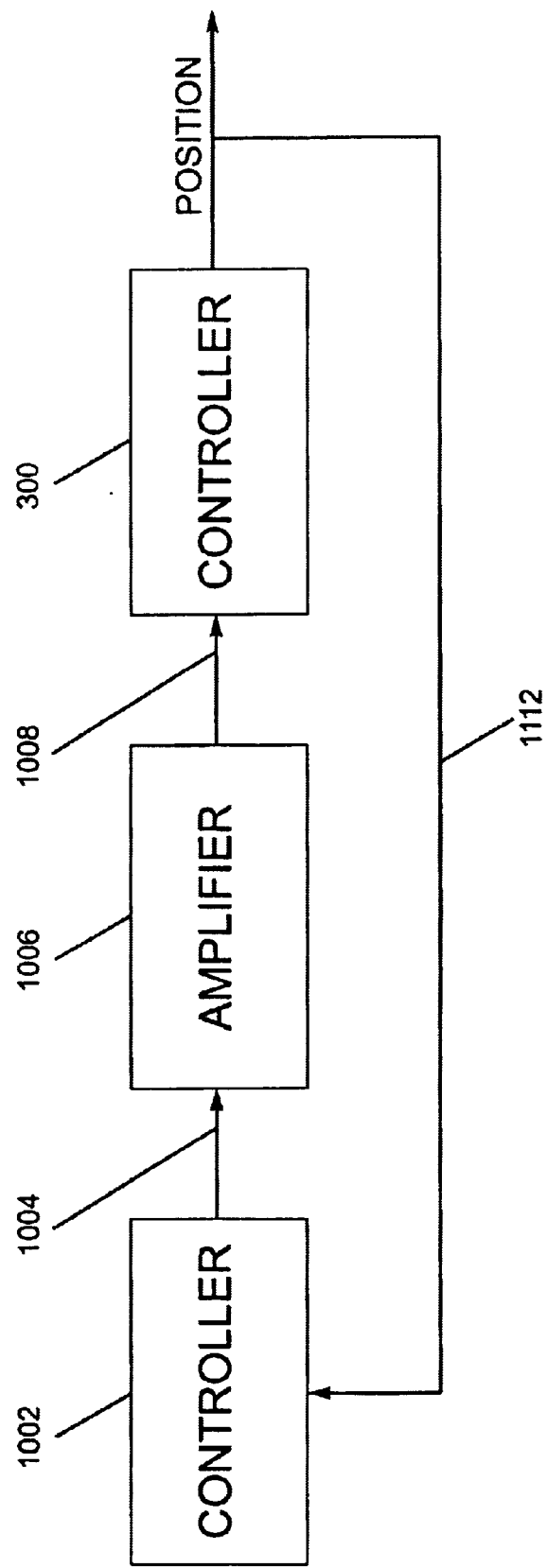
FIG. 10 is a functional block diagram depicting a system incorporating a parallel mechanism in accordance with the present invention.

With reference now to FIG. 10, a block diagram depicting a system 1000 incorporating a manipulator 300 in accordance with an embodiment of the present invention is illustrated. In general, in addition to the manipulator 300, the system includes a controller 1002 and an amplifier 1004. The controller 1002 may comprise a microcontroller or central processing unit. For example, the controller 1002 may be an Acroloop, MEI, Galil, Delta Tau, or National Instruments. In general, the controller 1002 determines the desired position of the mobile plate 308 with respect to the base plate 304, or receives instructions to place the mobile plate 308 in a desired position with respect to the base plate 304. The controller 1002 then calculates the length of each kinematic link 312 required to achieve the desired position. In addition to placing the mobile plate 308 in a desired end position with respect to the base plate 304, it should be appreciated that the controller 1002 may determine the movements of the individual kinematic links 312 required to arrive at the desired end position by following a particular path. The controller 1002 provides control commands 1004 for effecting movement of each of the kinematic links 312 to the amplifier 1006.

The amplifier 1006 may comprise a digital to analog converter in combination with a signal amplifier in order to provide actuating signals 1008 to the actuator assemblies 340 associated with the kinematic links 312. For example, the amplifier 1006 may be a Nanomotion amplifier. The provision of control signals to the actuator assemblies 340 results in a change of position of the manipulator 300. The change in position may be detected as changes in the length of the individual kinematic links 312. In particular, the each encoder sensor 344 may sense movement of the corresponding encoder strip 352 relative to the encoder sensor 344. The encoder sensors 344 may then provide position signals 1112 to the controller 1002. In accordance with an embodiment of the present invention, the encoder sensors 344 are high resolution optical encoders available from Reneshaw™. Preferably, each encoder sensor 344 has a resolution of at least about 10 nm. More preferably, each encoder sensor 344 has a resolution of at least about 1 nm.

Figure 11:
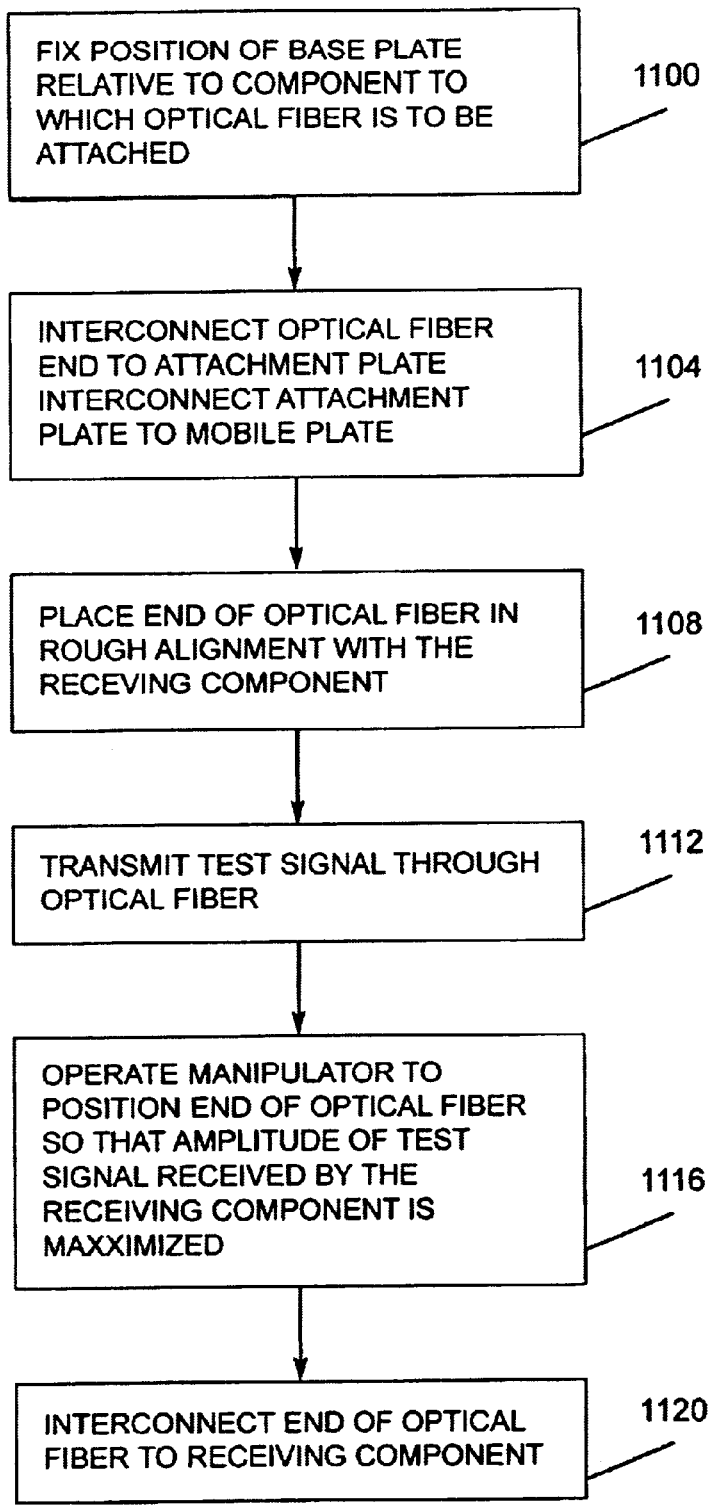
FIG. 11 is a flow chart depicting the operation of a system utilizing a parallel mechanism manipulator in accordance with an embodiment of the present invention.

With reference now to FIG. 11, a flow chart depicting the operation of a system 1000 in accordance with an embodiment of the present invention is illustrated, in the context of an example. In particular, FIG. 11 describes the positioning and attachment of an optical fiber to another component using a manipulator 300 in accordance with an embodiment of the present invention.

Initially, at step 1100, the position of the base 304 is fixed relative to the component to which the optical fiber is to be attached. Next, at step 1104, the end of the optical fiber is interconnected to an attachment plate 900, which is in turn interconnected to the mobile plate 308. At step 1108, the end of the optical fiber is placed in rough alignment with the receiving component. Such rough alignment may be performed manually, such as by a human operator visually aligning the fiber to the receiving component, or may be performed automatically, for example in connection with optical alignment devices.

At step 1112, a test signal is transmitted through the optical fiber, and the strength of that signal is monitored at the receiving component. At step 1116, the manipulator 300 is operated to maximize the amplitude of the transmitted signal at the receiving component. As can be appreciated by one of skill in the art, the alignment of an optical fiber to maximize signal amplitude may require translational changes in the position of the optical fiber of 100 nm or less, and preferably 60 nm or less. In addition, such positioning may require rotational changes in the position of the optical fiber of 10 degrees or less. Such changes in position may be performed in response to commands issued by a controller 1002 interconnected to the manipulator 300. Once maximum amplitude of the signal at the receiving component has been achieved, the optical fiber is interconnected to the receiving component, for example by laser or UV welding (step 1120). Monitoring of the strength of the transmitted signal and operation of the manipulator 300 to determine the optimal alignment of the end of the optical fiber with respect to the receiving component can be performed in connection with software available from SES Technology Integration, Inc, a division of Stress Engineering Services.

In order to achieve the desired resolutions of less than 50 nm of repeatability for movements that involve 6 degrees of freedom, a micromanipulator 300 in accordance with the present invention may provide kinematic links 312 capable of being moved in resolutions of 10 nm or less. In order to facilitate the reliable and repeatable movement of individual kinematic links 312 at such resolutions, the encoder sensor 344 preferably provides resolutions of 10 nm or less, and more preferably 1 nm or less, and the piezoelectric linear actuator assemblies 340 preferably provide resolutions of less than about 10 nm, and more preferably 1 nm or less.

In connection with applications in which six degrees of freedom are not required, a tripod configuration may be utilized. In general, a tripod configuration provides translational movement along one axis, and rotational movement about two axes. A manipulator 1200 having a tripod configuration in accordance with the present invention is illustrated in FIG. 12, and generally includes a base plate 1204 interconnected to a mobile plate 1208 by three kinematic links 1212. In the embodiment illustrated in FIG. 12, the kinematic links 1212 are interconnected to the base plate by a first joint 1216 comprising a journal bearing 1220. The first joint 1216 need only provide for rotation of a corresponding kinematic link about a single axis, because the tripod configuration does not permit the mobile plate 1208 to be rotated relative to the base plate 1204 by altering the lengths of the kinematic links 312. The top joint 1228 may comprise a universal joint 1230. As can be appreciated by one of skill in the art, a kinematic link 1212 may be interconnected to the plates by other types of joints 1216 and 1228. For example, joints like the joints 316 and 328 disclosed in connection with FIG. 3 may be utilized. Furthermore, the actuator assemblies 1240 and encoder sensor 1244 may be like those utilized in connection with the actuator assemblies 340 and encoder sensors 344 disclosed in connection with FIG. 3.

Although the manipulator 1200 having a tripod configuration in accordance with the present invention is capable of providing only three degrees of freedom, it is capable of providing very high precision repeatability and/or movement. In particular, the manipulator 1200 may provide movement with a precision of 40 nm or better.

Furthermore, the manufacture and control of the manipulator 1200 is simplified as compared to manipulators having more than three kinematic links. Therefore, the manipulator 1200 may be advantageous in connection with applications requiring extremely small positioning resolutions, in which only three degrees of freedom are required. Furthermore, where additional degrees of freedom are required, a manipulator 1200 having a tripod configuration may include additional linear or rotary stages.

Although the description set forth herein has noted the positioning of optical fibers and micro surgery as particular applications of the present invention, the present invention is not so limited. For example, the present invention is also suitable for use in connection with component testing, component assembly, micro-machinery, semiconductor manufacture, pharmaceutical applications, as an analytical instrument for use in connection with robot design, and any other application where extremely precise movement, positioning, or movement and positioning of components or instruments is desirable.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A parallel kinematic device, comprising:
    a base plate;
    a mobile plate; and
    at least three kinematic links, wherein each of said kinematic links comprises:
        a first end interconnected to said base plate by a first joint;
        a second end interconnected to said mobile plate by a second joint;
        a slide member;
        a carrier member;
        a first piezoelectric linear actuator assembly, wherein said mobile plate can be moved with respect to said base plate with at least three degrees of freedom, and wherein said first piezoelectric linear actuator assembly comprises:
    a piezoelectric ceramic element comprising:
        a first face;
        a second face; and
        at least a first edge;
    a plurality of electrodes interconnected to said first face;
    a single electrode interconnected to said second face; and
    a finger interconnected to said at least a first edge, wherein selective electrical excitation of at least two of said plurality of electrodes causes said slide member to move relative to said carrier member.

2. The device of claim 1, wherein said piezoelectric actuator assembly comprises first and second piezoelectric ceramic actuators, wherein said first piezoelectric ceramic actuator comprises a finger acting on a first side of said slide member, and wherein said second piezoelectric ceramic actuator comprises a finger acting on a second side of said slide member.

3. The device of claim 1, wherein said at least three kinematic links comprise six kinematic links, and wherein said mobile plate can be moved with respect to said base plate with at least six degrees of freedom.

4. The device of claim 1, wherein said first joint comprises a universal joint.

5. The device of claim 1, wherein said second joint comprises:
    a universal joint; and
    a thrust bearing.

6. The device of claim 1, wherein at least one of said first and second joints comprise a spherical bearing.

7. The device of claim 1, wherein said slide member and said carrier member are interconnected by a prismatic joint.

8. The device of claim 7, wherein said prismatic joint comprises a cross roller bearing.

9. The device of claim 1, further comprising a controller wherein each of said kinematic links has a programmable length.

10. The device of claim 9, wherein each of said kinematic links further comprises an encoder, wherein a length of said kinematic links can be determined.

11. The device of claim 10, wherein said encoder comprises a high resolution optical encoder.

12. The device of claim 1, wherein said mobile plate is capable of being moved with respect to said base plate with a resolution of about 50 nm or less.

13. The device of claim 1, wherein said mobile plate is capable of being moved with respect to said base plate with a resolution of about 10 nm or less.

14. The device of claim 1, wherein said piezoelectric linear actuator assembly has a resolution of less than about 50 nanometers.

15. The device of claim 1, wherein a position of said mobile plate with respect to said base plate can be repeated to within at least 50 nanometers.

16. A method for positioning components comprising:
    providing a mobile plate;
    interconnecting a first component to said mobile plate;
    providing a base plate;
    providing a second component wherein a position of said second component is fixed relative to said base plate;
    interconnecting said mobile plate and said base plate with a plurality of kinematic links, wherein each of said kinematic links comprises a linear piezoelectric actuator assembly;
    providing electrical excitation to at least one of said linear piezoelectric actuator assemblies, wherein said first component is selectively placed in a first position relative to said second component with a repeatability of at least about 50 nm.

17. The method of claim 16, wherein said step of providing electrical excitation comprises:
    determining a desired position of said mobile plate relative to said base plate;
    calculating a length of each of said kinematic links required to place said mobile plate in said desired position relative to said base plate.

18. The method of claim 16, wherein said first component comprises a fiber optic cable, said method further comprising:
    providing a test signal to said fiber optic cable;
    monitoring an amplitude of said test signal received by said second component while said first component is in said first position, wherein a first amplitude is detected;
    providing electrical excitation to at least a one of said linear piezoelectric actuator assemblies, wherein said first component is selectively placed in a second position relative to said second component;
    monitoring an amplitude of said test signal received by said second component while said first component is in said second position, wherein a second amplitude is detected, and wherein said first amplitude is greater than said second amplitude;
    providing electrical excitation to at least a one of said linear piezoelectric actuator assemblies, wherein said first component is returned to said first position relative to said second component.

19. The method of claim 18, wherein said first component is returned to said first position relative to said second component with a repeatability of at least about 50 nm.

20. A parallel kinematic device, comprising:
    a base plate;
    a mobile plate; and at least three kinematic links, wherein each of said kinematic links comprises:
a first end interconnected to said base plate by a first joint;
a second end interconnected to said mobile plate by a second joint;
a slide member;
a carrier member;
a first piezoelectric linear actuator assembly, wherein said mobile plate can be moved with respect to said base plate with at least three degrees of freedom and with a resolution of about 50 nm or less.

21. The device of claim 20, wherein said piezoelectric actuator assembly comprises first and second piezoelectric ceramic actuators, wherein said first piezoelectric ceramic actuator comprises a finger acting on a first side of said slide member, and wherein said second piezoelectric ceramic actuator comprises a finger acting on a second side of said slide member.

22. The device of claim 20, wherein said at least three kinematic links comprise six kinematic links, and wherein said mobile plate can be moved with respect to said base plate with at least six degrees of freedom.

23. The device of claim 20, wherein said first joint comprises a universal joint.

24. The device of claim 20, wherein said second joint comprises:
a universal joint; and
a thrust bearing.

25. The device of claim 20, wherein at least one of said first and second joints comprise a spherical bearing.

26. The device of claim 20, wherein said slide member and said carrier member are interconnected by a prismatic joint.

27. The device of claim 26, wherein said prismatic joint comprises a cross roller bearing.

28. The device of claim 20, further comprising a controller wherein each of said kinematic links has a programmable length.

29. The device of claim 28, wherein each of said kinematic links further comprises an encoder, wherein a length of said kinematic links can be determined.

30. The device of claim 29, wherein said encoder comprises a high resolution optical encoder.

31. The device of claim 20, wherein said mobile plate is capable of being moved with respect to said base plate with a resolution of about 10 nm or less.

32. The device of claim 20, wherein said piezoelectric linear actuator assembly has a resolution of less than about 50 nanometers.

33. The device of claim 20, wherein a position of said mobile plate with respect to said base plate can be repeated to within at least 50 nanometers.

34. A parallel kinematic device, comprising:
a base plate;
a mobile plate; and
at least three kinematic links, wherein each of said kinematic links comprises:
a first end interconnected to said base plate by a first joint;
a second end interconnected to said mobile plate by a second joint;
a slide member;
a carrier member;
a first piezoelectric linear actuator assembly, wherein said mobile plate can be moved with respect to said base plate with at least three degrees of freedom and wherein said piezoelectric linear actuator assembly has a resolution of less than about 50 nanometers.

35. The device of claim 34, wherein said piezoelectric actuator assembly comprises first and second piezoelectric ceramic actuators, wherein said first piezoelectric ceramic actuator comprises a finger acting on a first side of said slide member, and wherein said second piezoelectric ceramic actuator comprises a finger acting on a second side of said slide member.

36. The device of claim 34, wherein said at least three kinematic links comprise six kinematic links, and wherein said mobile plate can be moved with respect to said base plate with at least six degrees of freedom.

37. The device of claim 34, wherein said first joint comprises a universal joint.

38. The device of claim 34, wherein said second joint comprises:
a universal joint; and
a thrust bearing.

39. The device of claim 34, wherein at least one of said first and second joints comprise a spherical bearing.

40. The device of claim 34, wherein said slide member and said carrier member are interconnected by a prismatic joint.

41. The device of claim 40, wherein said prismatic joint comprises a cross roller bearing.

42. The device of claim 34, further comprising a controller wherein each of said kinematic links has a programmable length.

43. The device of claim 42, wherein each of said kinematic links further comprises an encoder, wherein a length of said kinematic links can be determined.

44. The device of claim 43, wherein said encoder comprises a high resolution optical encoder.

45. The device of claim 34, wherein said mobile plate is capable of being moved with respect to said base plate with a resolution of about 10 nm or less.

46. The device of claim 34, wherein a position of said mobile plate with respect to said base plate can be repeated to within at least 50 nanometers.

47. A parallel kinematic device, comprising:
a base plate;
a mobile plate; and
at least three kinematic links, wherein each of said kinematic links comprises:
a first end interconnected to said base plate by a first joint;
a second end interconnected to said mobile plate by a second joint;
a slide member;
a carrier member;
a first piezoelectric linear actuator assembly, wherein said mobile plate can be moved with respect to said base plate with at least three degrees of freedom and wherein a position of said mobile plate with respect to said base plate can be repeated to within at least 50 nanometers.

48. The device of claim 47, wherein said piezoelectric actuator assembly comprises first and second piezoelectric ceramic actuators, wherein said first piezoelectric ceramic actuator comprises a finger acting on a first side of said slide member, and wherein said second piezoelectric ceramic actuator comprises a finger acting on a second side of said slide member.

49. The device of claim 47, wherein said at least three kinematic links comprise six kinematic links, and wherein said mobile plate can be moved with respect to said base plate with at least six degrees of freedom.

50. The device of claim 47, wherein said first joint comprises a universal joint.

51. The device of claim 47, wherein said second joint comprises:
   a universal joint; and
   a thrust bearing.

52. The device of claim 47, wherein at least one of said first and second joints comprise a spherical bearing.

53. The device of claim 47, wherein said slide member and said carrier member are interconnected by a prismatic joint.

54. The device of claim 53, wherein said prismatic joint comprises a cross roller bearing.

55. The device of claim 47, further comprising a controller wherein each of said kinematic links has a programmable length.

56. The device of claim 55, wherein each of said kinematic links further comprises an encoder, wherein a length of said kinematic links can be determined.

57. The device of claim 56, wherein said encoder comprises a high resolution optical encoder.

58. The device of claim 47, wherein said mobile plate is capable of being moved with respect to said base plate with a resolution of about 10 nm or less.

59. A method for positioning components comprising:
   providing a mobile plate;
   interconnecting a fiber optic cable to said mobile plate;
   providing a base plate;
   providing a component wherein a position of said component is fixed relative to said base plate;
   interconnecting said mobile plate and said base plate with a plurality of kinematic links, wherein each of said kinematic links comprises a linear piezoelectric actuator assembly;
   providing electrical excitation to at least one of said linear piezoelectric actuator assemblies, wherein said fiber optic cable is selectively placed in a first position relative to said component;
   providing a test signal to said fiber optic cable;
   monitoring an amplitude of said test signal received by said component while said fiber optic cable is in said first position, wherein a first amplitude is detected;
   providing electrical excitation to at least a one of said linear piezoelectric actuator assemblies, wherein said fiber optic cable is selectively placed in a second position relative to said component;
   monitoring an amplitude of said test signal received by said component while said fiber optic cable is in said second position, wherein a second amplitude is detected, and wherein said first amplitude is greater than said second amplitude;
   providing electrical excitation to at least a one of said linear piezoelectric actuator assemblies, wherein said fiber optic cable is returned to said first position relative to said component with a repeatability of at least about 50 nm.

60. The method of claim 59, wherein said step of providing electrical excitation comprises:
   determining a desired position of said mobile plate relative to said base plate;
   calculating a length of each of said kinematic links required to place said mobile plate in said desired position relative to said base plate.

* * * * *